(12) United States Patent
Kosanovic et al.

(10) Patent No.: US 7,353,217 B2
(45) Date of Patent: Apr. 1, 2008

(54) INTELLIGENT REALTIME MANAGEMENT OF PROCESSING RESOURCES

(75) Inventors: Bogdan Kosanovic, Bethesda, MD (US); Charles Fosgate, Germantown, MD (US); Yimin Zhang, Boyds, MD (US)

(73) Assignee: Texas Instruments Incorporated, Dallas, TX (US)

( * ) Notice: Subject to any disclaimer, the term of this patent is extended or adjusted under 35 U.S.C. 154(b) by 582 days.

(21) Appl. No.: 10/630,756

(22) Filed: Jul. 31, 2003

(65) Prior Publication Data

US 2004/0210903 A1     Oct. 21, 2004

Related U.S. Application Data

(63) Continuation-in-part of application No. 09/871,775, filed on Jun. 1, 2001, now abandoned.

(60) Provisional application No. 60/485,842, filed on Jul. 9, 2003.

(51) Int. Cl.
*G06F 9/44*     (2006.01)
*G06N 7/02*     (2006.01)
*G06N 7/06*     (2006.01)

(52) U.S. Cl. .............................. 706/52; 706/14; 706/12
(58) Field of Classification Search .................. 706/52, 706/14, 12; 379/406.09
See application file for complete search history.

(56) References Cited

U.S. PATENT DOCUMENTS 6,185,300 B1 *  2/2001  Romesburg ............ 379/406.09
6,301,357 B1 * 10/2001  Romesburg ............ 379/406.06

OTHER PUBLICATIONS

Christina Breining, A robust Fuzzy Logic-Based Step-Gain control for Adaptive Filters in Acoustic Echo Cancellation, Feb. 2001, IEEE, 162-167.*
Geun-Taek Ryu et al., Double Talk Detection in Adaptive Echo Canceller using Fuzzy Logic, 1996, Proceedings of ICSP, 1643-1646.*
Geun-Taek Ryu et al., Convergence Implement of adaptive Lattice Algorithm with Fuzzy Based Adaptive Gain, 1998, IEEE, 0-7803-5146-0, 411-414.*

* cited by examiner

*Primary Examiner*—Joseph P Hirl
(74) *Attorney, Agent, or Firm*—Steven A. Shaw; W. James Brady; Frederick J. Telecky, Jr.

(57) ABSTRACT

A method and system for ordering a priority for a function to receive any type of processing resources in a system that includes a plurality of functions. The invention includes identifying a plurality of instances of the functions that use processing resources. The invention then determines an importance of at least one of said instances by using fuzzy logic in a fuzzy inference system.

21 Claims, 4 Drawing Sheets

GENERAL SPFIS INPUT
VARIABLE MEMBERSHIP FUNCTIONS

ACOM IN dB

INTELLIGENT REALTIME MANAGEMENT OF PROCESSING RESOURCES

CROSS-REFERENCE TO RELATED APPLICATIONS

This application is a continuation-in-part of application Ser. No. 09/871,775, REAL-TIME EMBEDDED RESOURCE MANAGEMENT SYSTEM, filed on Jun. 1, 2001; now abandoned and also claims priority under 35 USC § 119(e)(1) of Provisional Application Ser. No. 60/485, 842, for MIPs AGENT INTELLIGENT SCHEDULER, filed on Jul. 9, 2003.

FIELD OF THE INVENTION

The present invention relates to a intelligent management of processing functions via scheduling control of multiple instances of functions using fuzzy logic.

BACKGROUND OF THE INVENTION

The processing needs in any system is limited partially by the rate at which instructions and controls may be performed. The functionality provided by a system is also limited by the resource requirements of the instruction or control and the total resources available for performance.

For example, the processing resources of any digital signal processor (DSP) is limited partially by the rate at which instructions may be performed. This rate is commonly referred to as the MIPS (million instructions per second) of the DSP chip. Typically, the functionality provided by a DSP is limited by either the MIPS or memory requirements of the algorithms that will execute on the core.

SUMMARY OF THE INVENTION

There is described herein is a system and method for determining an importance of a function instance using fuzzy logic in a fuzzy inference system.

A first aspect of the claimed invention includes a method to determine an order for a function to receive processing resources in a system that includes a plurality of functions that comprises identifying, a plurality of instances of said functions in the system that use processing resources and determining an importance of at least one of said instances with a fuzzy inference system. A further aspect of the invention includes preventing starvation of one of said function instances by determining a recent time period that said processing resources were allocated to said instance function. In another aspect, the method prevents starvation of one of said function instances by determining a recent time period where said instance function contains signal energy that would allow an execution of one of said instance.

A further aspect of the method of the present invention includes fuzzification of a plurality of inputs by said fuzzy inference system, wherein said fuzzification comprises associating said inputs with a plurality of membership functions. In yet another aspect, the invention includes defining a plurality of rules for scaling an output of said fuzzy inference system. In still another aspect, the invention includes aggregating a plurality of said scaled outputs into a single fuzzy output variable, wherein said output determines said importance of said instance function.

The invention also includes the method of ordering, with a scheduling priority fuzzy inference system, said instances to receive said processing resources. This method further includes determining an amount of the processing resources available for distribution to each of the function instances, and allocating the available processing resources to the function instances according to said ordering.

In a further aspect of the present invention the identifying step includes identifying a plurality of echo canceller instance functions that use said processing resources, and the determining step includes determining importance of at least one of said echo canceller instance functions using said fuzzy inference system. The method also includes fuzzification of a plurality of echo cancellation inputs by said fuzzy inference system.

Other aspects of the present invention includes updating a local state information storage with a plurality of echo cancelling instance events, determining, from the local state information storage, the available processing resources for said echo canceller instance functions, and allocating available processing resources to the echo canceller instance functions according to the importance of said instance functions.

In another aspect of a system of the present invention, the system determines an order a plurality of function instances to receive processing resources. This system includes a function ordering module, comprising a fuzzy inference system, to determine an importance of at least one of said function instances using said fuzzy inference system, and a resource allocator to allocate processing resources to said function instances.

Advantages of the present invention include the fact that system resources are re-ordered according to importance of function or function instance so as to optimize aggregate performance of system without exceeding the total processing resources of the system. In the example of a digital signal processor, the invention allows processing resources to be shared among multiple function instances such that a core may execute algorithms that would normally exceed the core's total processing ability.

BRIEF DESCRIPTION OF THE DRAWINGS

Preferred embodiments of the invention are discussed hereinafter in reference to the drawings, in which.

DEFINITIONS

ACOM Combined loss
CSS Composite Source Signal
DSP Digital Signal Processor
ECU Echo Cancellation Unit
ERL Echo Return Loss
FIS Fuzz Inference System
MAG MIPS Agent
MIPS Million Instructions Per Second
MOX MIPS Agent provided Opportunity to execute
SOX Signal-provided Opportunity to execute
SPFIS Scheduling Priority Fuzzy Inference System
$t_{MOX}$ Time since the most recent MOX
$t_{SOX}$ Time since the most recent SOX
WGN White Gaussian Noise

DETAILED DESCRIPTION OF THE INVENTION

Figure 1:
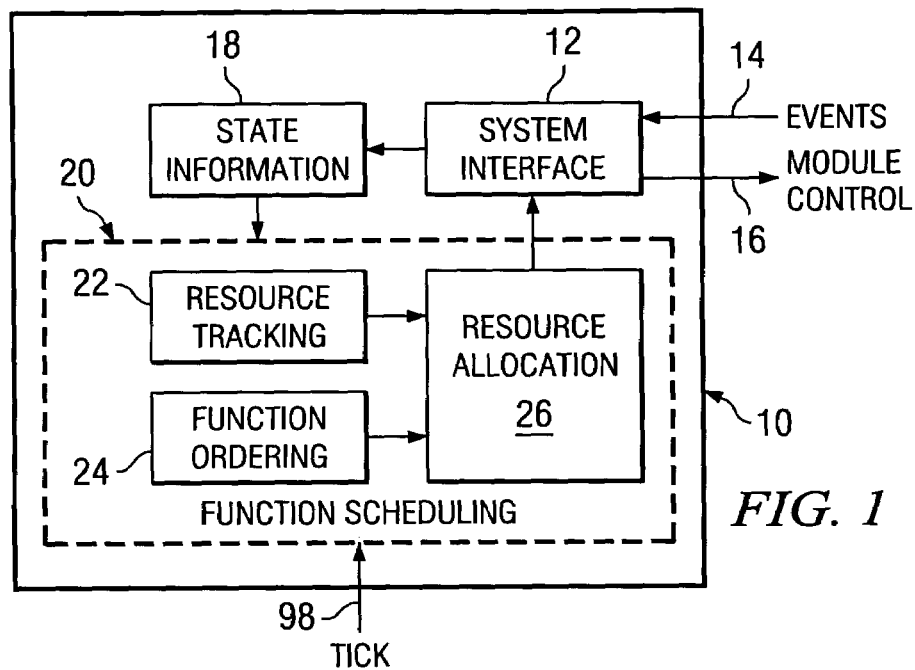
FIG. 1 is a block diagram of functional blocks for a software agent of the preferred embodiment.

An exemplary embodiment of the claimed invention is illustrated in FIG. 1. The embodiment comprises an agent in a system that has multiple instances of the same or similar software module(s) that execute on a processor core. The agent distributes processor resources among the multiple instance functions in order to maximize resources of the core. Examples of processing resources include MIPS (millions of instructions per second) resources of DSPs (digital signal processors), microcontrollers, or ASICs (application-specific integrated circuits).

The agent optimizes processing resources for multiple instances of functions operating on the core. Without the agent, the contemporaneous execution of the multiple instances would exceed the core's processing capacity. Therefore, higher densities of instances and functions running on a core are possible by monitoring, ordering, and allocating processing resources using the agent.

FIG. 1 is a block diagram illustrating an exemplary functional configuration of the preferred embodiment. The agent 10 comprises six functional modules represented as blocks system interface 12, state information 18, and a function scheduler 20 that comprises resource tracking 22, function ordering 24, and resource allocation 26. The system interface 12 is the interface between the agent 10 and external functions and modules. The system interface 12 fields events 14 from function instances and externally controls modules 16 and instance functions within those modules. Upon reception of an event 14, the agent 10 seizes control, handles the event, and then returns control to the calling function. The events fielded 14 are asynchronous and can occur at any point during operations. Information about the system and those modules comprising the system is gathered through the system interface 12 and sent to state information block 18. The system interface also receives information from resource allocation block 26 regarding allocation of processing resources to module instance functions. System Interface block 12 communicates with external modules 16 to turn modules on, off, or adjust their speed of execution to distribute available processing resources. When the system interface receives events 14, it sends the information gathered about the event to the state information block 18.

State information block 18 receives and stores information from events concerning distinct modules or the entire system. Information may include type of codec, system state changes, and other module events. Block 18 stores any system and state information for both the system and the module that influence system processing resources. For example, when multiple instances of a module are running on a core, information that determines consumed processing resources for each module instance are received through system interface 12 and stored in the state information block 18.

State information is passed to the function scheduler 20, which as stated previously, includes resource tracking 22, function ordering 24, and resource allocation 26 blocks. Resource tracking block 22 tracks an estimate of total system processing resource requirements in real time and receives state information regarding changes in the amount of processing resources available for instance module functions. Resource tracking block 22 then adds together the processing resources consumed by the system overhead, codec, specific modules, and subtracts the consumed resources from the total available processing resources on the core to determine the amount of resources available for execution of additional instance functions. The processing resources are estimated based on resource consumption lookup tables for each function.

Function ordering block 24 prioritizes functions from multiple instances of a program that are operating within a software module. The intelligent prioritization technique prioritizes instance functions such that resources are allocated in an intelligent manner using a fuzzy inference system (FIS).

Function ordering block 24 enables functions according to a refresh rate, which must be an integral multiple of the timing tick 28. A tick is the smallest unit of time for the agent of the present invention. Function scheduling block 20 receives tick 28 at a configurable period, for example every frame of samples to be processed. After N ticks (configurable), the states of the module are reviewed for changes. When the function scheduling block 20 reaches a refresh time, it notifies the function ordering block 24 to refresh all active queues.

Figure 2:
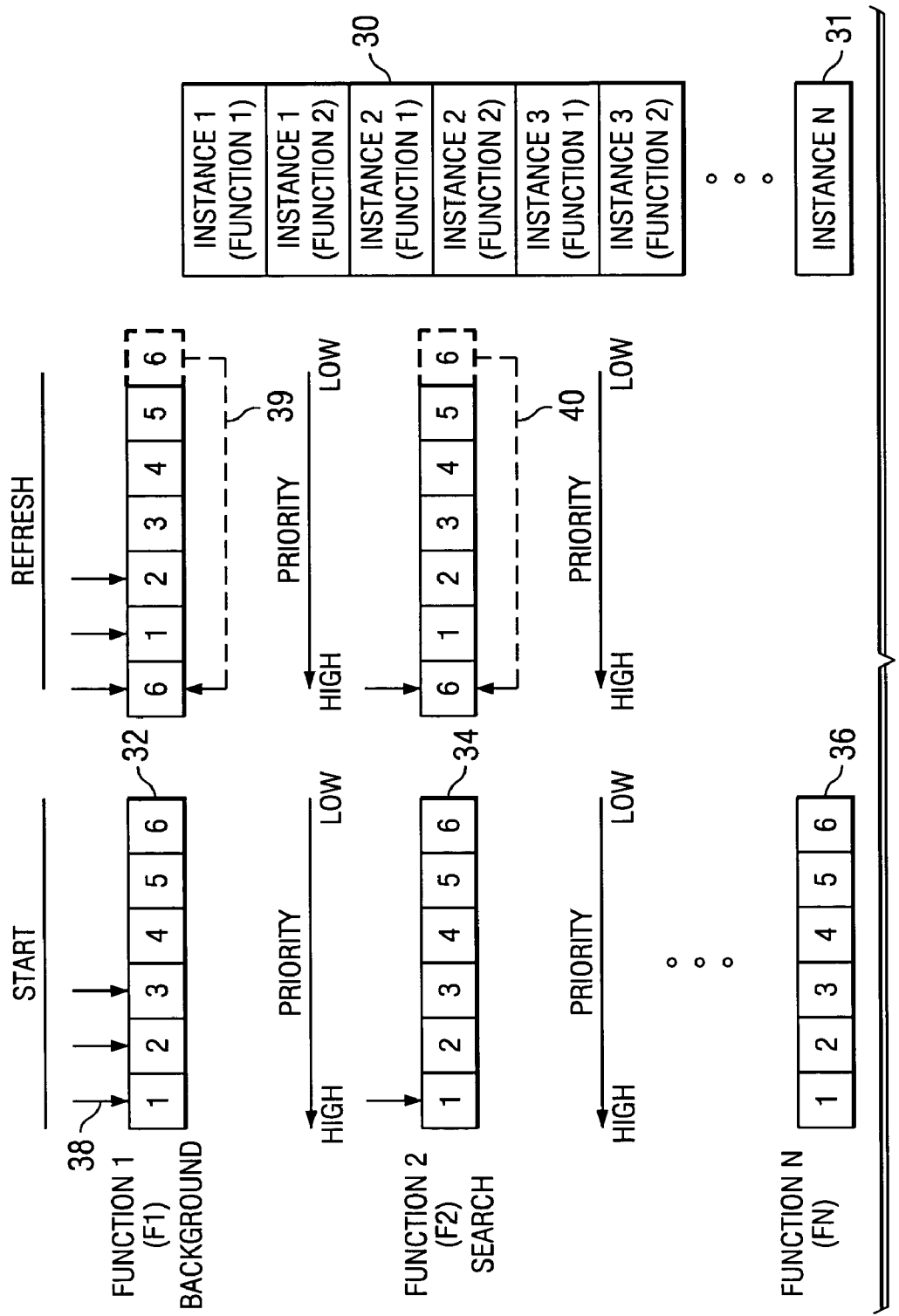
FIG. 2 is a diagram of a function scheduling queue.

FIG. 2 illustrates how a round robin method for function ordering would enable function instances in a queue. Block 30 represents a processor, such as a DSP (digital signal processor), having instances 1 through 3 that represent multiple instances of an application or algorithm operating on the DSP. Instances continue up to N instances in block 31. Each instance has functions that are enabled according to a schedule. As an example, instance functions are grouped into queues F1 (Function 1) 32, and F2 (Function 2) 34, which could continue up to FN (Function N) 36. A scheduling technique determines priorities and order for each function in each queue, from highest to lowest priority. In F1 and F2, numbered slots within each queue correspond to functions from multiple instances. Function instances in queue F1 (32) are numbered 1, 2, 3, 4, 5, 6 in order from highest to lowest priority and functions in queue F2 (34) are similarly numbered 1, 2, 3, 4, 5, and 6 in order of highest to lowest priority.

In a round-robin ordering scheme, instance functions are enabled when they both have priority in the function queue and are allocated processing resources by the MIPS allocation block 20. As a function reaches the end of the queue it accordingly has lowest priority. The function's priority subsequently jumps from lowest to highest on the next round robin circular queue shift. The remaining functions in the queue shift to lower priorities. In FIG. 2, queue F1 instance functions 1, 2, and 3 are enabled, as designated by arrows 38. Instance number six occupies the lowest priority position and will have highest priority upon the next circular queue shift. Upon refresh, instance six moves to the highest priority at the beginning of the queue (step 39), and is subsequently enabled. In the example, only three instances are enabled at any one time, therefore instances six, one, and two are enabled and instance number three is disabled as it moves to a lower priority position. FIG. 2 shows Function 2 (F2) 34 in a round-robin ordering scheme similar to queue F1 (32).

Resource allocation block 26 would step through all active queues and sequentially controls each function instance via the system interface 12 according to the current availability of processing resources. Upon each refresh the system interface 12 enables instance functions as instructed by the resource allocation 26 in prioritized order based on resource availability as specified by the resource tracking 22. All remaining instance functions that no longer have priority are subsequently disabled.

Figure 3:
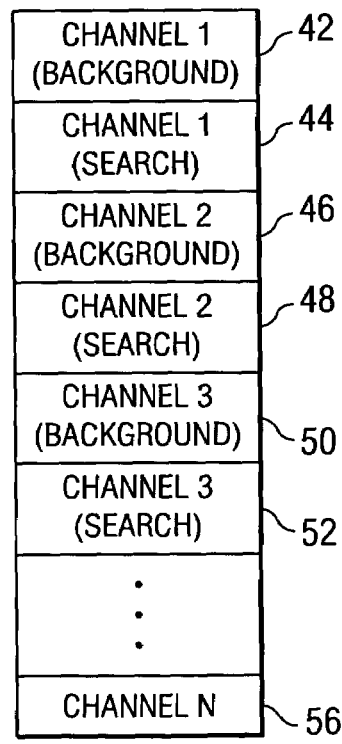
FIG. 3 is a diagram a conventional echo cancellation unit.

In an exemplary embodiment, the processing resources are managed for multiple instances of an echo cancellation unit (ECU) having multiple channels of speech. FIG. 3 illustrates a block of communication channels, one through N, on a core where an echo cancellation module contemporaneously executes multiple echo cancellation instances. In the illustration, channel one (42) is running a background filter update and simultaneously running hybrid search processing 44. Similarly, channels two and three each run hybrid search processing 48, 52 and background filter update 46, 50. The system continues on to N channels 56 having N background updates and N search instances.

An ECU is used to prevent line echo in telephone networks. The cause of line echo is an analog device called a 2-to-4 wire hybrid. The traditional hybrid is a pair of transformers that use inductive coupling to split a duplex signal into two simplex signals. To reduce the cost of wiring between the central office and the telephone set at the subscriber site, the electrical connection is via a 2-wire line, whereas the connection in the central office uses four wires. Hybrids are physically located at a telephone system's central office. In a conventional telephone, the hybrid was realized by means of a tuned transformer. Due to the impedance mismatch between the hybrid and the telephone line, some of the signal transmitted from the 4-wire side returns and corrupts the signal, generating an echo that may be very disconcerting in voice communications.

While the echo in human communications can be tolerated, in modem communications echo can be catastrophic to the call connection. To solve this problem, telephone service companies employ a device called an echo canceller. This device generally employs an adaptive filter that adjusts its coefficients to match the impulse response of the physical hybrid. An echo cancellation unit (ECU) is placed in the telephone network as close to the source of the echo as possible to remove echo from the lines.

Figure 4:
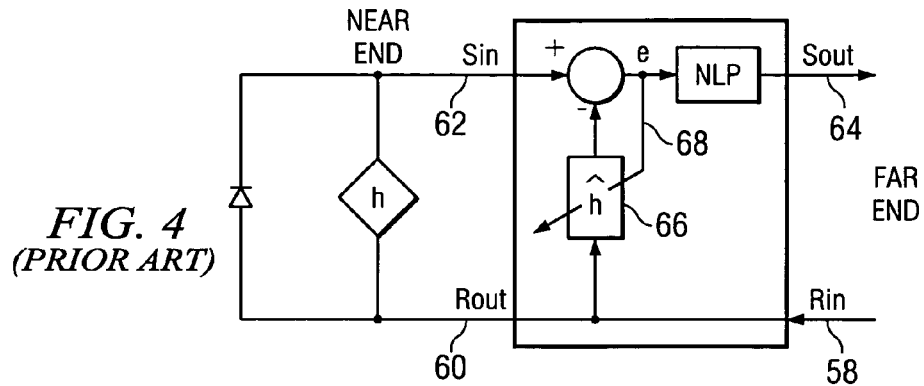
FIG. 4 is a block diagram illustrating multiple channels of an echo cancellation unit.

As illustrated in FIG. 4, a conventional ECU may be represented as a quadripole connected as shown, where $R_{in}$ 58 represents a Receive-In port, $R_{out}$ 60 represents the Receive-Out port, $S_{in}$ 62 represents the Send-In port, and $S_{out}$ represents the Send-Out port, as stated in ITU-T G.165. An echo canceller is typically a transversal filter, with the far-end speech signal, Rin, as the reference input and a near-end input, Sin. The Sin signal, y(n), consists of two components: the echo of the reference signal, r(n), and the near-end speech signal coming from a second caller, s(n). The output of the filter is the estimated echo. The estimated echo is subtracted from the near-end signal, y(n). The difference, called the error signal e(n) 68, is fed back into the echo canceller and used to adapt the coefficients of the transversal filter. The objective to the coefficient adaptation process is to minimize the average Mean-Squared Error between the actual echo and the echo estimate.

Figure 5:
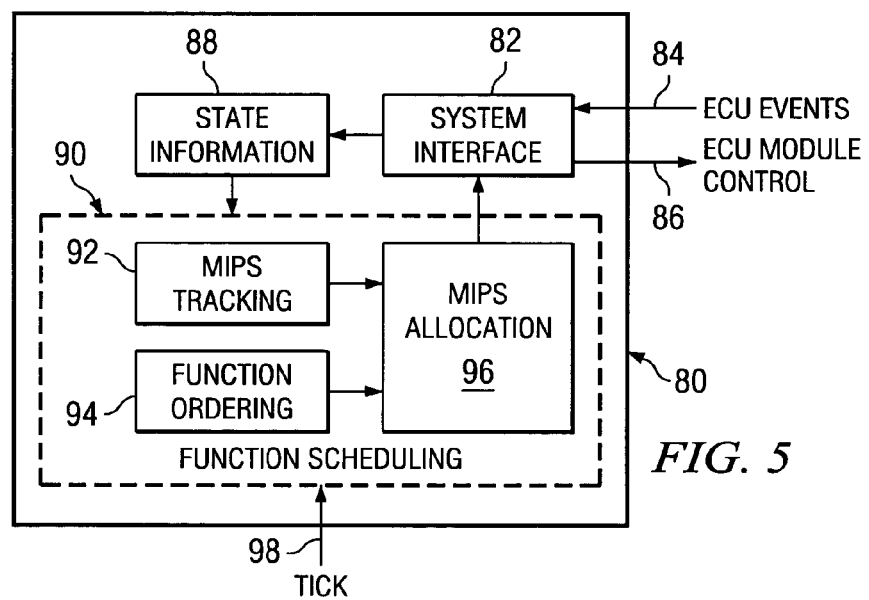
FIG. 5 is a diagram of function blocks for the software agent for an echo cancellation unit.

Referring to the exemplary MAG diagram for an ECU in FIG. 5, system interface block 80 controls external ECU functions for the purpose of regulating MIPS consumption. The system interface 80 fields externally generated ECU events and performs event-specific processing. Upon reception of an ECU event 84, system interface 82 seizes control, sends data from the event to ECU state information block 88, and if necessary controls the ECU module 86 based on instructions from function scheduling 98. Controls include enabling or disabling specific ECU functions. Each ECU event 84 is fielded and handled asynchronously, and no event queue is used to store events for scheduled processing.

State information block 88 is where state information for each operating ECU instance is stored. Stored information includes the background filter information, foreground filter information, search filter information, and the current state of each echo canceller. Furthermore, information regarding other system modules such as codec encoders/decoders is kept for reference. State information is accessed by the function scheduling block 90. Function scheduling block 90 manages MIPS tracking, function ordering, and MIPS allocation and ensures that the total MIPS allocation remains within specified bounds.

Within the function scheduling block 90, MIPS tracking block 92 dynamically tracks an estimate of the MIPS used throughout the DSP core so as to determine MIPS availability for all ECU instances as well as all ECU instance functions. As an example, the system tracks an estimate of codec MIPS, ISR MIPS, and voice channel state MIPS. Codec MIPS are allocated for each voice channel for codec operation. A lookup table is used to retain reference data for approximate MIPS consumed by the encoder and decoder. Voice channel state MIPS is the sum of all MIPS required by the system that are not associated with the ECU, codecs or ISRs. Voice channel state MIPS is a static number selected according to the system and platform and does not vary from data stored in the lookup table. Functionality included in the system state MIPS include tone detection, voice activity detection, and control. A lookup table is used to estimate MIPS consumption based on system states. The echo cancellation MIPS are echo removal, background filter adaptation, hybrid search processing, and foreground processing. To estimate the MIPS required for echo removal in a channel, $MIPS_{ER}$, the following formula is used:

$$MIPS_{ER} = aN_t + bN_s + c \tag{1}$$

where $N_t$ is the number of taps of the foreground filter and $N_s$ is the number of distinct hybrid segments in the foreground filter. The coefficients a, b, and c are stored in an echo removal reference table. The coefficients a, b, and c are generated offline based on function profiling. Echo removal is always performed by all active ECU instances unless the ECU is turned off, therefore echo cancellation is always enabled and will consume MIPS during execution. The sum of these values are subtracted from total MIPS available for the specific core to determine the MIPS that remain for specific ECU functions.

Information from the MIPS tracking block 92 is sent to the MIPS allocation block 96. Further, function ordering block 94 uses a fuzzy inference system of the preferred embodiment to determine importance of each instance function and order the instance functions based upon the importance. Determining ordering of instance functions according to importance allows the MAG to schedule the allocation of processing resources of instance functions on an as-needed basis.

In the preferred embodiment, an importance of a function instance is determined using fuzzy logic in a fuzzy inference system. A fuzzy inference system (FIS) is a system that uses fuzzy logic to map one or more inputs to one or more outputs. By determining an importance of an instance at any point in time, as compared with other instances, any instance may be ordered such that the instances needing greater resources may be prioritized ahead of other instances, thereby raising the performance of the function instances relative to other active functions. In other words, the function ordering module 94 may use fuzzy scheduling (e.g., using a scheduling priority fuzzy inference system (SPFIS) as described below) to allocate resources to a function by ordering the importance of that function with respect to similar functions based upon metrics associated with the function.

A function ordering technique of the present invention that is based on fuzzy logic has the advantages of the ability to model expert systems comprising inputs with uncertainties that cannot be modeled with pure logic. In other words, fuzzy logic uses a system with inputs that can be true or false to a certain degree, according to membership in a set. Fuzzy systems are based on rules that may be obtained using heuristics (e.g., from a human expert), or from inferential rules based on a behavior of the system. The flexibility in which additional functionalities may be added for a process control are also advantages of the fuzzy inference system. The fuzzy inference system of the present invention provides an intelligent ordering technique that results in a superior aggregate performance of any method or system.

Fuzzy logic may be considered an extension of conventional Boolean logic in that logical values are not restricted to zero (FALSE) and one (TRUE), but rather can take on any value between zero and one inclusive. This provides greater flexibility and precision in the description process. For example, if membership in the set of "tall people" was represented with a Boolean variable, there will likely be controversy over where to set a "tall" threshold (e.g., the cutoff height for defining what is a "tall" person). On the other hand, with fuzzy logic, membership is represented by a continuum of values. One individual may receive 0.8 membership while another individual may receive 0.1 membership in the "tall" set.

As stated previously, a fuzzy inference system (FIS) is a system that uses fuzzy logic to map one or more inputs to one or more outputs. The FIS employed in an exemplary embodiment is based on Mamdani's fuzzy inference method, although one skilled in the art will recognize that the fuzzy method of the present invention is not limited merely to a particular fuzzy logic method. Mamdani's method uses fuzzy inference in which both the inputs and outputs are treated as fuzzy variables.

A fuzzy inference system may generally be described functionally in five steps. These steps are the following:
1. Fuzzification of inputs through membership functions;
2. Application of fuzzy operations as defined by the rules;
3. Implication to create fuzzy outputs for each rule;
4. Aggregation of fuzzy rule outputs; and
5. Defuzzification of aggregated fuzzy output.

The exemplary embodiment uses steps one through five in the FIS. Step five, defuzzification of aggregated fuzzy output, is implemented in the exemplary embodiment because direct fuzzy outputs are used to perform ordering of function instances. However, one skilled in the art will recognize that defuzzification of aggregated fuzzy output may also be implemented in the embodiments without departing from the scope of the present invention. The steps will be described in more detail below, as implemented in the FIS application, which includes the scheduling priority fuzzy inference system (SPFIS).

In an exemplary MAG for an echo cancellation unit, one instance may have a far greater instantaneous MIPS requirement than other instances. For example, if the queues illustrated in FIG. 2 are applied to an ECU, the ECU may have a function queue F1 of a background update and a function queue F2 of a hybrid search. The use of a round-robin type of method for ordering of ECU instances in the queues, however, may not fully optimize performance of the ECU.

At any point in time, instance functions may have different processing (e.g., MIPS) needs. For example, one instance function may have better performance metrics than another, and all instances may not achieve the same performance in synchronous time. At any point in time, all instances may not have the same combined loss, all channels in an ECU may not have a signal, all instances may not have been provided an opportunity to execute by the MIPS agent, and all active instances may not have converged. If one instance does not have signal energy, then there is no need to allocate processing resources to that particular instance, regardless of the instance's ordering in a queue for receiving processing resources. Further, if an ECU instance has reached a certain level of convergence, then there is no need to allocate additional processing resources to that specific instance regardless of the order of the instance in a resource allocation queue.

Alternatively, an ECU instance may have signal energy and may be in the process of converging but requires additional resources due to environmental factors such as noise. In this case, even if the instance would otherwise have a low ordering priority in a queue, the instance may be re-ordered into a high priority position and receive additional processing resources. These resource needs are accounted for, and ordering priorities are applied by, function scheduling module 90 of MAG 80.

As a further example, suppose that telephone channel three in FIG. 2 has recently opened and accordingly, ECU instance three has not achieved an acceptable level of convergence. All other ECU instances may have had adequate time to converge and may not require processing resources as urgently as an instance that needs an increase in performance. Note that due to a round-robin technique of ordering shown in FIG. 2, each instance in a queue would be offered equal processing resources over time, regardless instantaneous resource requirements. Thus, in a round robin method of ordering the function queues instance three will perform background adaptation in F1 one-half of the time (if three instances are executed simultaneously) and performs a hybrid search in F2 one-sixth of the time. However, it may be preferable to provide instance three with the majority of processing resources that are available until the instance can achieve a level of performance (e.g., convergence) that is comparable to the other active instances.

MAG 80 orders ECU instance functions such that processing resources (e.g., MIPS in a DSP) are allocated to instance functions in an intelligent manner. MAG 80 controls echo cancellation functions in realtime, thereby providing an increase in the aggregate performance of ECU instances without exceeding realtime maximum processing capacity. In the exemplary embodiment, the ordering of ECU determined by use of the fuzzy inference system (FIS).

Thus, the processing resources allocated to each ECU channel is determined using fuzzy logic and ordering of instances based upon performance instead of a position in a queue.

MAG 80 redistributes resources to improve the aggregate performance over all instances of the ECU with the system interface 82. Since an echo canceller algorithm has distinct functions that are separable and manageable, ECU system interface 82 provides control of external function instances (e.g. on/off or slow/fast). The MAG 80 controls functions of multiple instances of an ECU and monitors system states so that ECU functions are enabled and executed in a manner that best utilizes the available processing resources.

In ECU function ordering block 94, an FIS is employed determine importance that is applied to order the hybrid search and background updates. The FIS may be used independently for each function or alternately may combined, such as for an ECU hybrid search and background update together. In the exemplary embodiment, the FIS is used to provide an importance to the outputs from the inputs. The FIS is called twice: once for each function instance queue. This could also be accomplished by providing all inputs to a single FIS that is called once and provides both hybrid search and background update outputs together.

Each execution of the SPFIS will map multiple inputs to an output. This output will be the importance of an instance function and will take on a value between zero and one. Hence, the SPFIS will be executed for every active instance function requiring scheduling.

In an exemplary embodiment, four inputs are mapped to the SPFIS that will provide knowledge of the current state of the specific ECU function instance. From these inputs, the SPFIS will be able to determine the relative importance of each ECU function instance. The four exemplary inputs to the SPFIS are the following:

Input 1. ECU combined loss (ACOM) estimate in dB.

Input 2. ECU near-end noise estimate in dBm0.

Input 3. Time since the most recent MAG-provided opportunity to execute ($t_{MOX}$).

Input 4. Time since the most recent signal-related opportunity to execute ($t_{SOX}$).

When the SPFIS is used to determine the order of importance of a hybrid search in an ECU instance function, inputs three and four, above, will refer to execution of the hybrid search algorithm. Similarly, when the SPFIS is used to determine the scheduling priority of a background update ECU instance function, inputs three and four will refer to execution of the background update algorithm.

Figure 6:
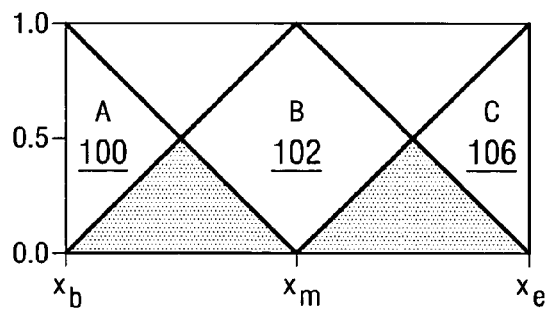
FIG. 6 is a graph of general input variable functions of the preferred scheduling priority fuzzy inference system.

In fuzzy inference systems, input membership functions provide a mapping from input values to membership within fuzzy sets. Membership always lies between zero and one inclusive. All inputs are evaluated for membership within three fuzzy sets. The three membership functions associated with each input variable have the same general triangular form as those displayed in FIG. 6. The values for $x_b$, $x_m$ and $x_e$, will be all values that vary for each group of membership functions. In FIG. 6, membership within each fuzzy set is represented by regions A (100), B (102), and C (106). The symmetry of the sets for $x<x_m$ and $x>x_m$ provides for efficient calculation of membership within each of the three sets.

Combined loss (ACOM) in an ECU measures the "combined" loss of signal energy due to both hybrid reflection and any performed echo cancellation. Accordingly, ACOM is an important performance measure for an echo canceller. For example, a low combined loss likely indicates that further convergence is possible.

Figure 7:
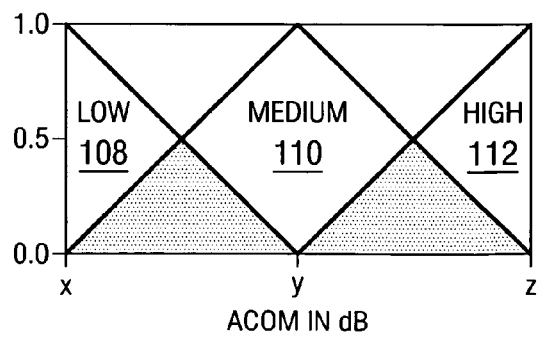
FIG. 7 is a graph of combined loss input variables membership functions.

The combined loss estimate membership functions are illustrated in FIG. 7. Three fuzzy sets are exemplarily defined as follows: low 108, medium 110, and high 112. The membership of the ACOM input variable is evaluated in each set.

The near-end noise estimate provides a measure of the noise power at the cancelling input to the echo canceller. Accordingly, a high near-end noise estimate can indicate that an echo canceller may have difficulty achieving high ACOM or even that the ACOM estimate is unreliable.

Figure 8:
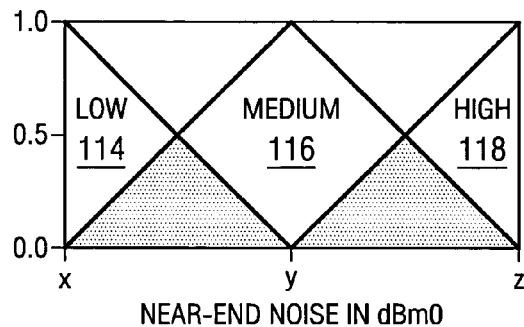
FIG. 8 is a graph of near-end noise input variable membership functions.

The near-end noise estimate membership functions are illustrated below in FIG. 8. Three fuzzy sets are exemplarily defined as follows: low 114, medium 116, and high 118, and the membership of the near-end noise input variable is evaluated in each set. Accordingly, these membership functions map near-end noise. This mapping can also be considered as defining the degree to which any near-end noise input (in the defined range) belongs to each set.

The time since the most recent MIPS Agent provided opportunity to execute ($t_{MOX}$) provides a means to prevent starvation of any function instance. This input is a measure of how long it has been since the MAG has allocated processing resources to the function instance such that it could execute. As such, a low $t_{MOX}$ indicates that the function instance was allocated processing resources recently while a high $t_{MOX}$ indicates that it has been awhile since the function instance had an opportunity to execute.

Figure 9:
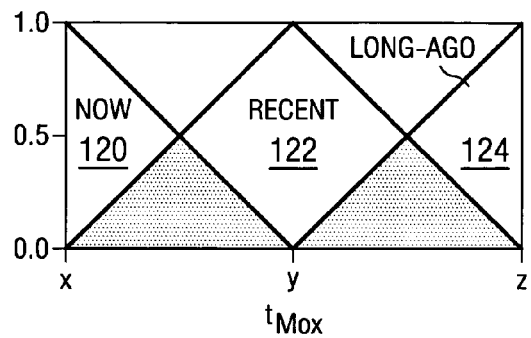
FIG. 9 is a graph of input variable membership functions for the time since most recent opportunity to execute an instance function.

The $t_{MOX}$ input membership functions are illustrated below in FIG. 9. Three fuzzy sets are exemplarily defined as follows: now 120, recent 122, and long-ago 124. The evaluate membership of the $t_{MOX}$ input variable is evaluated within each set. Accordingly, these membership functions map $t_{MOX}$ input values to membership in the three fuzzy sets. This mapping can be viewed as defining the degree to which any $t_{MOX}$ input (in the defined range) belongs to each set. Any value that falls outside the defined $t_{MOX}$ input variable range is saturated to either the maximum or minimum defined value.

In the exemplary embodiment, a $t_{MOX}$ input values of x are considered as "now," y as "recent" and z as "long ago." The $t_{MOX}$ input variable-membership functions take this a step further and specify degrees of now, recent and long-ago for all $t_{MOX}$ input values. The values of the $t_{MOX}$ input variable are intentionally disassociated from any specific time increment. This allows for the association between increments and time to be configurable.

The time since the most recent signal energy provided opportunity to execute ($t_{SOX}$) provides an additional means to ensure that no function instance starves. This input is a measure of how long a time has elapsed since a function instance had signal energy that allowed execution. For example, the ECU requires the far-end signal energy be above some threshold for filter adaptation to occur.

This metric is applied as a further safeguard against starvation. While $t_{MOX}$ ensures that every function instance is periodically afforded the processing resources required to execute, starvation may still occur if a function instance never exploits the opportunity. The $t_{SOX}$ input provides a measure of time passed since a function instance had signal energy that actually allowed it to make use of available processing resources. As with $t_{MOX}$, a low $t_{SOX}$ indicates that the function instance recently had signal(s) that provided the opportunity to execute, while a high $t_{SOX}$ indicates that a longer time period has elapsed since the function instance had signals that allowed execution.

Figure 10:
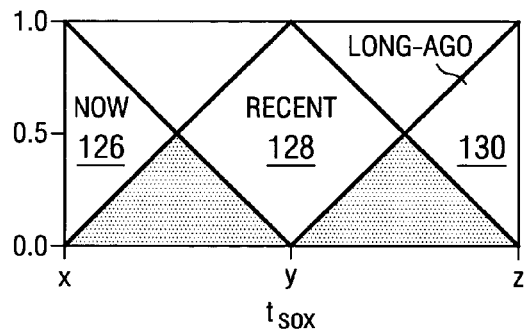
FIG. 10 is a graph of input variable membership functions for the time since most recent signal energy provided opportunity to execute an instance function.

The $t_{SOX}$ input membership functions are illustrated in FIG. 10. Three fuzzy sets are exemplarily defined as follows:

now 126, recent 128, and long-ago 130. The membership of the $t_{SOX}$ input variable is evaluated for each set. Accordingly, these membership functions map $t_{SOX}$ input values to membership in the three fuzzy sets. This mapping can be viewed as defining the degree to which any $t_{SOX}$ input (in the defined range) belongs to each set. Any value that falls outside the defined $t_{SOX}$ input variable range is saturated to either the maximum or minimum defined value.

As with $t_{MOX}$, the values of the $t_{SOX}$ input variable are intentionally disassociated from any specific time increment. This allows for the association between increments and time to be configurable. In fuzzy inference systems, output membership functions help provide a mapping from membership within fuzzy sets to a fuzzy output. As with the input membership functions, output membership lies between zero and one inclusive.

The exemplary SPFIS utilizes one output variable, ordering importance. The importance fuzzy output value ranges from zero to one, where zero and one reflect low and high priority, respectively. The fuzzy outputs provide the means to determine relative ordering of function instances.

Figure 11:
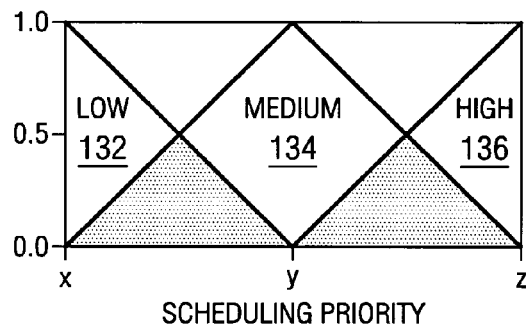
FIG. 11 is a graph of scheduling priority output membership functions.

The membership functions for the output variable have the same characteristics as those for the input membership functions (see FIG. 11). Namely, three triangular membership functions are exemplarily defined: low 132, medium 134, and high 136, with symmetry about the mid-point of the defined range.

The three exemplarily defined ordered fuzzy sets are: low priority, medium priority and high priority. These fuzzy sets provide the means to map the implication of the rules back to a fuzzy output variable. As stated previously, the output of every rule defines a scaling for one of these fuzzy sets. Aggregation provides the final mapping from these fuzzy sets to the fuzzy output.

The rules that define the decision making process of a fuzzy inference system generally define scaling of output fuzzy sets based on logical combinations of membership in input fuzzy sets. For example, in Boolean logic a logical output may be based on one or more logical inputs as illustrated by the following statement:

IF (A OR B) AND C THEN X

Where A, B, C, and X are Boolean variables having the values TRUE or FALSE. Similar statements may be made in fuzzy logic Further, the definition of THEN, or implication, is defined various ways well known in fuzzy control. For the exemplary embodiment, THEN is defined as a scaling, or product, of the fuzzy output.

For the SPFIS, rules are specified to define scaling of the three fuzzy sets: {low, medium and high priority} based on logical combinations of the twelve fuzzy inputs: {low, medium and high ACOM}, {low, medium and high NOISE}, {now, recent and long-ago $t_{MOX}$ and {now, recent and long-ago $t_{SOX}$}.

The exemplary rules are as follows:
rule 1. if ACOM is medium AND NOISE is high THEN priority is high;
rule 2. if ACOM is high AND NOISE is low THEN priority is low;
rule 3. if ACOM is medium AND NOISE is NOT high THEN priority is medium;
rule 4. if ACOM is high AND NOISE IS NOT low THEN priority is medium.

These four exemplary rules define the output priority for all near-end noise levels when the combined loss is either medium or high.

However, low combined loss is treated differently. Specifically, $t_{MOX}$ and $t_{SOX}$ are taken into account in determining scheduling priority when the combined loss is low. The exemplary rules are as follows:
rule 5. if ACOM is low AND $t_{SOX}$ is NOT long-ago THEN priority is high;
rule 6. if ACOM is low AND $t_{SOX}$ is long-ago AND $t_{MOX}$ is now THEN priority is low;
rule 7. if ACOM is low AND $t_{SOX}$ is long-ago AND $t_{MOX}$ is recent THEN priority is medium;
rule 8. if ACOM is low AND $t_{SOX}$ is long-ago AND $t_{MOX}$ is long-ago THEN priority is high.

Further, illustrates the rules governing $t_{MOX}$ and $t_{SOX}$ without dependence on ACOM. Exemplary rules nine through fourteen are as follows:
rule 9. if $t_{SOX}$ is recent THEN priority is medium;
rule 10. if $t_{SOX}$ is long-ago AND $t_{MOX}$ is NOT long-ago THEN priority is low;
rule 11. if $t_{SOX}$ is long-ago AND $t_{MOX}$ is long-ago THEN priority is medium;
rule 12. if $t_{SOX}$ is now AND $t_{MOX}$ is now THEN priority is low;
rule 13. if $t_{SOX}$ is now AND $t_{MOX}$ is recent THEN priority is medium;
rule 14. if $t_{SOX}$ is now AND $t_{MOX}$ is long-ago THEN priority is high.

As stated previously, the fourth and fifth functional steps of the FIS comprise aggregation of fuzzy outputs for each rule and defuzzification of aggregated fuzzy output, respectively. Aggregation is the processes of combining the scaled outputs from all rules into a single fuzzy output variable. Aggregation uses the sum of the scaled individual fuzzy sets from each rule as the aggregate output. A defuzzification method, if employed, would use the center-of-mass of this set as the method.

To reduce the processing requirements of the SPFIS, the exemplary steps of aggregation and defuzzification are mathematically simplified as follows.

The output from each rule is a scaling factor to be applied to a particular fuzzy set, where the scaling factors are represented as, $S_i$, i ∈{1, 2, ..., N}, where N=the total number of rules.

The rules are partitioned into groups that apply to each output set as $R_L=\{S_i\}$, i ∈{1, 2, ..., N} such that $S_i$ is a scaling for a priority membership function;

This allows the N scaling factors to be reduced to three, one for each group $S_L$, $S_M$, and $S_H$ that are obtained through aggregation of individual factors.

$$S_L = \sum_{i \in R_L} S_i \quad (1.5)$$

$$S_M = \sum_{i \in R_M} S_i \quad (1.6)$$

$$S_H = \sum_{i \in R_H} S_i \quad (1.7)$$

Exemplary aggregation output, g(x), will combine functions for an exemplary defuzzification using the functions $$g(x)=G(S_L, S_M, S_H, f_L(x), f_M(x), f_H(x))$$

where the functions $f_L(x)$, $f_M(x)$, $f_H(x)$ refer to the low, medium and high scheduling priority membership functions, respectively.

In the exemplary embodiment, the SPFIS orders ECU function instances within each MAG function queue. Once all ordering is calculated for a particular MAG function queue, the final step is to sort the instances from highest to lowest priority within the queue for subsequent scheduling.

The primary goal of the MIPS allocation in the exemplary embodiment is to allow maximum aggregate ECU performance while limiting all ECU instances to operate within available processing resources.

Figure 12:
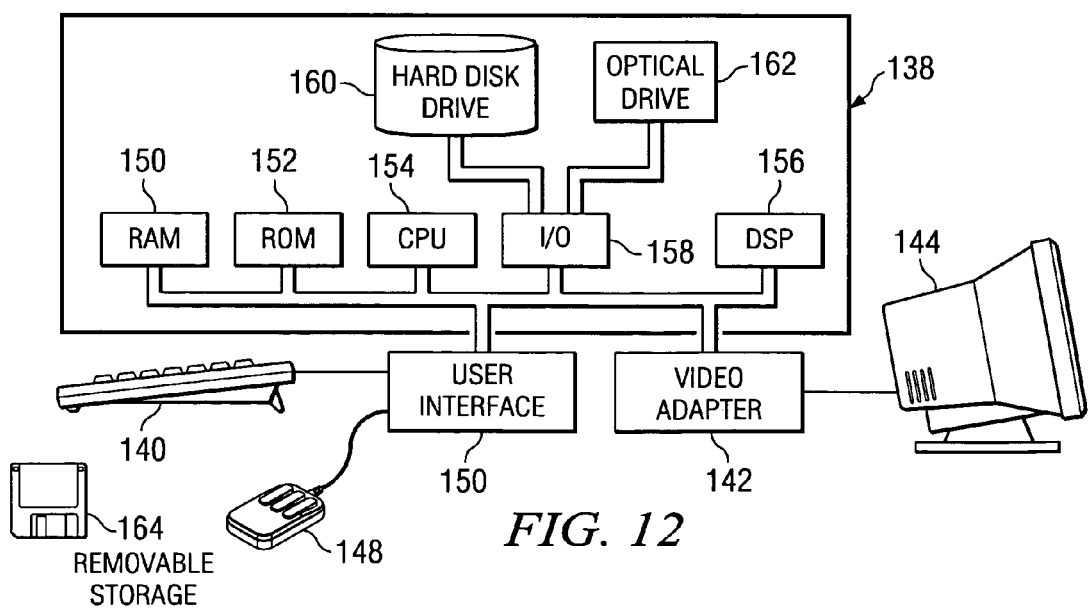
FIG. 12 is a diagram of an exemplary computer for executing the software agent of the exemplary embodiments.

The present invention is not limited as to the type system, machine, or processor on which it executes. The embodiments described herein may be implemented in either hardware or software systems. For example, FIG. 12 illustrates a type of computer 138 for executing the embodiments. Computer 138 typically includes a keyboard 140, a pointing device such as a mouse 148, and a video adapter 142 driving a monitor 144. The computer 138 also typically comprises computer-readable mediums that include a random access memory (RAM) 150, a read only memory (ROM) 152 (e.g., flash-ROM, nonvolatile ROM), a central processing unit (CPU)154, a DSP 156, and a storage device such as a hard disk drive 160, optical (e.g., compact disk) drive 162, or floppy drive 164.

Because many varying and different embodiments may be made within the scope of the inventive concept herein presented, and because many modifications may be made in the embodiments herein detailed in accordance with the descriptive requirements of the law, it is to be understood that the details herein are to be interpreted as illustrative and not in a limiting sense.

What is claimed is:

1. A method for allocating processing resources of a processor to a function among a plurality of functions, said method comprising:
   identifying, in said system, a plurality of instances of said functions that use processing resources of said processor;
   determining, with a fuzzy inference system, an importance of at least one of said function instances;
   determining an amount of the processing resources available for distribution to the at least one of said function instances; and
   allocating the available processing resources to the function instances according to said ordering.

2. The method of claim 1, further comprising:
   preventing starvation of one of said function instances by determining a recent time period that said processing resources were allocated to said instance function.

3. The method of claim 1, further comprising:
   preventing starvation of one of said function instances by determining a recent time period where said instance function contains signal energy that would allow an execution of one of said instance.

4. The method of claim 1, further comprising:
   fuzzification of a plurality of inputs by said fuzzy inference system.

5. The method of claim 4, wherein said fuzzification comprises associating said inputs with a plurality of membership functions.

6. The method of claim 1, further comprising:
   defining a plurality of rules for scaling an output of said fuzzy inference system.

7. The method of claim 6, further comprising:
   aggregating a plurality of said scaled outputs into a single fuzzy output variable, wherein said output determines said importance of said instance function.

8. The method of claim 1, further comprising:
   ordering, with a scheduling priority fuzzy inference system said instances to receive said processing resources.

9. The method of claim 1, wherein said identifying comprises:
   identifying a plurality of echo canceller instance functions that use said processing resources; and
   said determining comprises determining said importance of at least one of said echo canceller instance functions using said fuzzy inference system.

10. The method of claim 9, further comprising:
    fuzzification of a plurality of echo cancellation inputs by said fuzzy inference system.

11. The method of claim 9, further comprising:
    updating a local state information storage with a plurality of echo cancelling instance events;
    determining, from the local state information storage, the available processing resources for said echo canceller instance functions; and
    allocating available processing resources to the echo canceller instance functions according to the importance of said instance functions.

12. A system for allocating processing resources of a processor to a function among a plurality of functions, comprising:
    a function ordering module, comprising a fuzzy inference system, to determine an importance ordering of at least one of said function instances that use processing resources of said processor using said fuzzy inference system; and
    a resource allocator to allocate processing resources to said function instances according to said ordering from said function ordering module.

13. The system of claim 12, wherein said function ordering module prevents a starvation of one of said function instances by determining a recent time period that said processing resources were allocated to said one of said instance functions.

14. The system of claim 13, wherein said function ordering module prevents a starvation of one of said function instances by determining a recent time period where said one of said instance function contains signal energy that would allow an execution of said one of said instances.

15. The system of claim 13, wherein said fuzzy inference system performs fuzzification of a plurality of inputs.

16. The system of claim 15, wherein said fuzzy inference system associates said inputs with a plurality of membership functions.

17. The system of claim 13, wherein said function ordering module defines a plurality of rules for scaling an output of said fuzzy inference system; and
    uses an aggregation process to combine said scaled outputs into a single fuzzy output variable.

18. The system of claim 13, further comprising:
    a resource tracker for determining an amount of the processing resources available for distribution to each of the function instances; and
    a resource allocator for allocating the available processing resources to the function instances according to said importance.

19. The system of claim 13, wherein said function ordering module determines an importance of a plurality of echo canceller instance functions.

20. The system of claim 19, further comprising:

an allocator for allocating said processing resources to the echo canceller instance functions according to said importance.

21. The system of claim 17, wherein said fuzzy interface system maps a plurality of inputs to an output, wherein said output determines said importance of each instance function.

* * * * *